(12) United States Patent
Kunieda

(10) Patent No.: US 9,489,941 B2
(45) Date of Patent: Nov. 8, 2016

(54) OPERATION ASSISTING METHOD AND OPERATION ASSISTING DEVICE

(71) Applicant: Panasonic Intellectual Property Management Co., Ltd., Osaka (JP)

(72) Inventor: Nobuyuki Kunieda, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/711,774

(22) Filed: May 14, 2015

(65) Prior Publication Data

US 2015/0340029 A1   Nov. 26, 2015

(30) Foreign Application Priority Data

May 20, 2014  (JP) ................................. 2014-104187

(51) Int. Cl.
*G10L 15/22* (2006.01)
*G10L 15/08* (2006.01)
*G10L 15/25* (2013.01)
*G10L 15/26* (2006.01)

(52) U.S. Cl.
CPC ............. *G10L 15/08* (2013.01); *G10L 15/083* (2013.01); *G10L 15/22* (2013.01); *G10L 15/25* (2013.01); *G10L 15/26* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| 2002/0107695 A1* | 8/2002 | Roth ...................... G10L 15/22 704/275 |
| 2004/0199388 A1* | 10/2004 | Armbruster ............. G10L 15/22 704/251 |
| 2008/0059175 A1* | 3/2008 | Miyajima ............... G10L 15/25 704/246 |
| 2009/0304232 A1 | 12/2009 | Tsukizawa |
| 2010/0256978 A1* | 10/2010 | Rosenbaum ........... G10L 15/22 704/244 |
| 2013/0185078 A1* | 7/2013 | Tzirkel-Hancock .... G10L 15/22 704/275 |
| 2015/0032448 A1* | 1/2015 | Wasserblat .............. G10L 15/26 704/235 |
| 2015/0161992 A1* | 6/2015 | Jung ..................... G10L 15/083 704/251 |

FOREIGN PATENT DOCUMENTS

| JP | 2010-281855 | 12/2010 |
| JP | 2012-242609 | 12/2012 |
| WO | 2008/007781 | 1/2008 |

* cited by examiner

*Primary Examiner* — Huyen Vo
*Assistant Examiner* — Yi-Sheng Wang
(74) *Attorney, Agent, or Firm* — Greenblum & Bernstein, P.L.C.

(57) ABSTRACT

An operation assisting method comprising, comparing an input spoken voice with a preliminarily stored keyword associated with an operation target to obtain an evaluation value of likelihood that the keyword is included in the spoken voice, and determining whether or not the keyword was spoken, based on the evaluation value of likelihood where it is determined that the keyword was spoken if the evaluation value of likelihood exceeds a threshold value, detecting whether or not eyes of a user are directed at the operation target. A threshold value is decreased in cases where the eyes of the user are directed at the operation target and where the evaluation value of the spoken voice falls within a predetermined range.

19 Claims, 12 Drawing Sheets

FIG. 12

| No. | REGISTERED KEYWORD | SIGHT-LINE DIRECTION |
|---|---|---|
| 1 | AIR-CONDITIONER OPERATION | OPERATION SCREEN OR ANTERIOR COLUMN COVER |
| 2 | AUDIO OPERATION | OPERATION SCREEN OR RIGHT DIRECTION |
| 3 | INFORMATION SEARCH | OPERATION SCREEN OR ANTERIOR INFORMATION |

OPERATION ASSISTING METHOD AND OPERATION ASSISTING DEVICE

BACKGROUND

1. Technical Field

The present disclosure relates to an operation assisting device and an operation assisting method that assist an operation based on the utterance of a keyword.

2. Description of the Related Art

In recent years, a technique for detecting, when a predetermined keyword is spoken, the keyword and starting a predetermined operation of an apparatus such as activating a system has been widely put to practical use.

Usually, determination of whether or not the keyword is spoken (hereinafter, called "keyword determination") is performed by calculating an evaluation value (score) indicating a plausibility (hereinafter, called a likelihood) that a keyword is included in a spoken voice and determining whether or not the evaluation value is greater than or equal to a predetermined threshold value. The evaluation value is calculated by, for example, voice recognition processing for the spoken voice.

However, in some cases, even if a keyword is actually spoken, an ambient sound, unintelligibility of utterance, or the like causes the evaluation value to be low. In this case, such a state occurs that it is difficult to operate an apparatus despite the utterance of the keyword (hereinafter, called "detection failure"). In addition, in contrast, in some cases, the evaluation value of an ambient sound or a spoken voice other than a keyword is high despite no actual utterance of a keyword. In this case, such a state occurs that an apparatus is unintentionally operated despite no utterance of a keyword (hereinafter, called "false detection").

Therefore, a technique in which a timing when a keyword is to be spoken is presented to a user with a voice from a device that assists an operation based on utterance and keyword determination is only performed on that timing is described in, for example, Japanese Unexamined Patent Application Publication No. 2010-281855. According to such a technique, as for an operation performed at the timing decided on the device side, it is possible to reduce the occurrences of the detection failure and the false detection.

In addition, in Japanese Unexamined Patent Application Publication No. 2012-242609, a technique is described in which the direction of eyes of a user is detected and a threshold value for keyword determination is decreased during a time interval in which the eyes of the user are directed at a robot that is an operation target. It is possible to reduce the detection failure with a decrease in the threshold value, and it is possible to reduce the false detection with an increase in the threshold value. Therefore, according to such a technique, as for an operation performed by the robot, which is caused when the user speaks to the robot, it is possible to reduce the occurrences of the detection failure and the false detection.

However, in the technique described in Japanese Unexamined Patent Application Publication No. 2010-281855, only at the timing decided on the device side, it is possible to perform an operation based on keyword utterance (hereinafter, called "keyword utterance operation"). In addition, the technique described in Japanese Unexamined Patent Application Publication No. 2012-242609 is only applicable to a use in which it is possible to look at an operation target for a relatively long time.

For example, such an operation that the driver of a vehicle turns on a car air-conditioner during driving is usually performed at any timing decided by the driver. In addition, it is difficult to perform such an operation while continuously looking at the device. Accordingly, it is difficult to apply the techniques described in Japanese Unexamined Patent Application Publication No. 2010-281855 and Japanese Unexamined Patent Application Publication No. 2012-242609 to such a use. In other words, in these techniques of the related art, it is possible to realize a highly accurate keyword utterance operation only in severely limited uses.

SUMMARY

One non-limiting and exemplary embodiment provides an operation assisting device and an operation assisting method capable of realizing highly accurate keyword utterance operations in wider uses.

In one general aspect, the techniques disclosed here feature an operation assisting method comprising, comparing an input spoken voice with a preliminarily stored keyword associated with an operation target to obtain an evaluation value of likelihood that the keyword is included in the spoken voice, and determining whether or not the keyword was spoken, based on the evaluation value of likelihood where it is determined that the keyword was spoken if the evaluation value of likelihood exceeds a threshold value, detecting whether or not eyes of a user are directed at the operation target, and decreasing a threshold value in cases where the eyes of the user are directed at the operation target and where the evaluation value of the spoken voice falls within a predetermined range.

According to the present disclosure, it is possible to realize highly accurate keyword utterance operations in wider uses.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 12 is a diagram illustrating an example of a table in which keywords and sight-line directions are associated with each other, in an example of a modification to an embodiment of the present disclosure.

DETAILED DESCRIPTION

Hereinafter, embodiments of the present disclosure will be described in detail with reference to drawings.

First Embodiment

A first embodiment of the present disclosure is a specific example of an embodiment in a case where the present disclosure is applied to an operation target installed in the vicinity of the driver seat of a vehicle.

<Configuration of Operation Assisting Device>

First, the configuration of an operation assisting device according to the present embodiment will be described.

Figure 1:
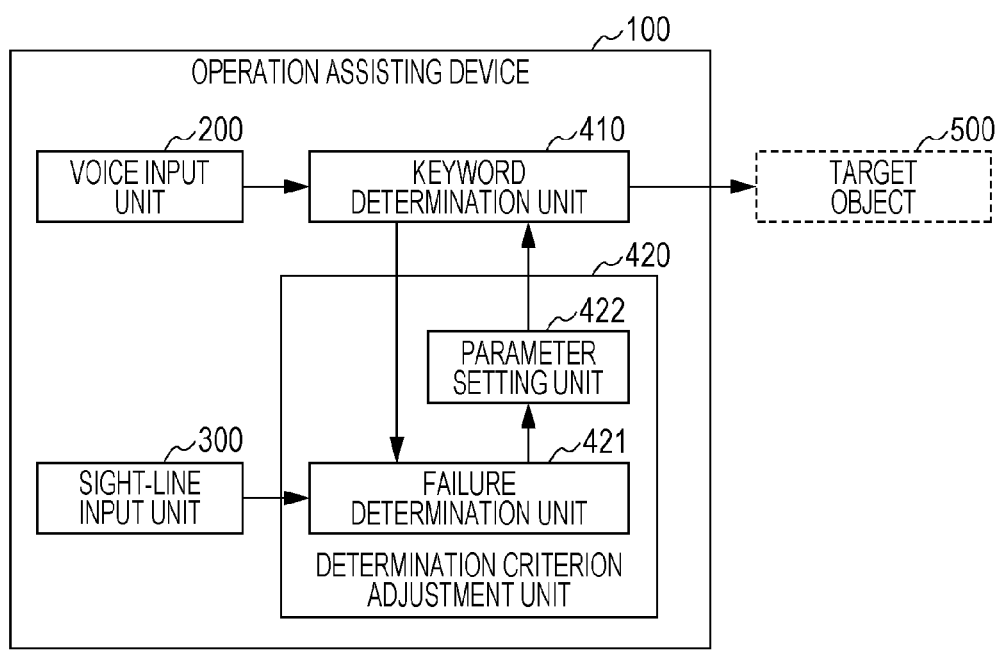
FIG. 1 is a block diagram illustrating an example of a configuration of an operation assisting device according to a first embodiment of the present disclosure.

FIG. 1 is a block diagram illustrating an example of the configuration of the operation assisting device according to the present embodiment.

In FIG. 1, an operation assisting device 100 includes a voice input unit 200, a sight-line input unit 300, a keyword determination unit 410, and a determination criterion adjustment unit 420. In addition, the operation assisting device 100 is connected to an operation target 500 (for example, a car air-conditioner controller) that is a target of a keyword utterance operation. In addition, the operation target 500 may be configured so as to be integrated with the operation assisting device 100.

It is assumed that keywords associated with the operation target 500 are preliminarily defined. In addition, it is assumed that such keywords are keywords for starting a predetermined operation (for example, dialogue processing with a user) for the operation target 500.

The voice input unit 200 inputs a spoken voice and outputs the input spoken voice to the keyword determination unit 410. The voice input unit 200 is equipped with, for example, a microphone (not illustrated), collects and converts an ambient sound into voice data, and outputs the voice data to the keyword determination unit 410. For example, in a case where the driver of a vehicle or a fellow passenger performs utterance, the spoken voice thereof turns out to be included in the voice data.

When the eyes of the user (for example, the driver of a vehicle) are directed at the operation target 500, the sight-line input unit 300 detects that fact, and gives notice about the fact to the determination criterion adjustment unit 420. The sight-line input unit 300 is equipped with, for example, a digital video camera (not illustrated), analyzes images obtained by capturing an image of the face of the user, and sequentially determines whether or not the eyes of the user are directed at the operation target 500. In addition, the digital video camera may be a visible light camera or an infrared camera.

The determination of whether or not the eyes of the user are directed at the operation target 500 (hereinafter, called "sight line determination") may be performed by adopting a publicly known sight-line direction detection method such as, for example, a method described in International Publication No. 2008/007781 and preliminarily setting a relative positional relationship between the position and the orientation of the digital video camera and the position of the operation target 500. In addition, in a case where a difference between the direction of the sight line and the direction of the operation target 500 viewed from the user falls within a predetermined range, the sight-line input unit 300 may determine that the user directs eyes at the operation target 500. Such a predetermined range is decided in consideration of, for example, the detection error of the sight-line direction or the installation errors of individual apparatuses.

The keyword determination unit 410 sequentially performs voice recognition processing for the voice data (spoken voice) input from the voice input unit 200 and calculates an evaluation value indicating a likelihood that one of the above-mentioned keywords is included in the spoken voice. In addition, the keyword determination unit 410 determines, based on the calculated evaluation value, whether or not a corresponding keyword is spoken.

More specifically, the keyword determination unit 410 performs determination (hereinafter, called "keyword determination") of whether or not a first condition that the evaluation value is at a first level corresponding to a relatively high value is satisfied. In a case where the first condition is satisfied, the keyword determination unit 410 determines that a corresponding keyword is spoken, and starts a predetermined operation for the operation target 500, based on the output of a control signal, or the like.

In addition, in a case where the first condition is not satisfied, the keyword determination unit 410 determines whether or not the evaluation value is at a second level lower than the first level (whether or not falls within a predetermined range). In addition, in a case where the evaluation value is at the second level, the keyword determination unit 410 gives notice about the fact to the determination criterion adjustment unit 420. In a case where the evaluation value is less than or equal to the second level, the keyword determination unit 410 determines, as a general rule, that a corresponding keyword is not spoken.

The evaluation value is set so as to become, for example, a value increased with an increase in a likelihood that a produced voice is a corresponding keyword. As the evaluation value, for example, confidence measure used at the time of determining whether a voice, included in the voice data and obtained by publicly known voice recognition processing, coincides with a corresponding keyword may be adopted. The confidence measure may be calculated based on a posterior probability in a hidden Markov model (HMM) or a likelihood (an acoustic likelihood or a linguistic likelihood) obtained by voice recognition processing. In this case, the keyword determination unit 410 preliminarily stores therein an acoustic model, a dictionary, and a language model, which relate to the above-mentioned keywords, and performs the voice recognition processing with reference to these pieces of information, thereby calculating the above-mentioned evaluation value.

Alternatively, as the evaluation value, for example, similarity calculated from distances between the pieces of voice data of the preliminarily registered keywords and the input voice data may be adopted. The similarity may be calculated by calculating distances between pieces of voice data using, for example, a publicly known distance calculation method that utilizes a predetermined sound feature quantity such as a spectrum and by performing dynamic programming (DP) matching in a voice interval. In this case, the keyword determination unit 410 preliminarily stores the pieces of voice data or the sound feature quantities of the above-mentioned keywords.

The determination criterion adjustment unit 420 lowers a criterion for the above-mentioned determination under the condition that the evaluation value is at the second level and immediately after that, the eyes of the user are directed at the operation target 500. More specifically, the determination criterion adjustment unit 420 changes a boundary value between the first level and the second level so that the boundary value temporarily becomes low, and the determination criterion adjustment unit 420 causes the keyword determination unit 410 to perform the above-mentioned determination. In other words, the determination criterion adjustment unit 420 performs a setting so that a possibility of determining that a keyword is spoken is high even in a case of the same spoken voice or the same evaluation value. The boundary value between the first level and the second level corresponds to the lower limit of the first level. Hereinafter, such a boundary value is called a "determination threshold value" as appropriate.

The determination criterion adjustment unit 420 includes a failure determination unit 421 and a parameter setting unit 422.

The failure determination unit 421 determines whether or not a second condition that the eyes of the user are directed at the operation target 500 after the evaluation value is at the second level is satisfied. The failure determination unit 421 performs such determination, based on, for example, the presences or absences of a notice from the keyword determination unit 410 and a notice from the sight-line input unit 300 and the timings of the individual notices. In addition, in a case where the second condition is satisfied, the failure determination unit 421 gives notice about the fact to the parameter setting unit 422.

In a case where the above-mentioned second condition is satisfied, the parameter setting unit 422 causes the keyword determination unit 410 to change the determination threshold value to a lower value and to perform secondary determination (hereinafter, called "keyword secondary determination" as appropriate) of whether or not the first condition is satisfied. Upon receiving, for example, a notice from the failure determination unit 421, the parameter setting unit 422 causes the keyword determination unit 410 to perform, using the changed determination threshold value, the keyword secondary determination targeted at a spoken voice newly input from the voice input unit 200, in other words, a spoken voice keyword not yet subjected to the keyword determination.

While not illustrated, the operation assisting device 100 includes, for example, a central processing unit (CPU), a storage medium such as a read only memory (ROM) storing therein a control program, and a working memory such as a random access memory (RAM). In this case, the CPU executes the control program, thereby realizing the functions of the above-mentioned individual units.

In a case where the second condition that the eyes of the user are directed at the operation target 500 after the evaluation value is at the second level is satisfied, it is possible for the operation assisting device 100 having such a configuration to lower the criterion for the keyword determination and to perform the keyword secondary determination.

<Lowering of Determination Criterion>

A case where the second condition that is a trigger for the lowering of the determination criterion is satisfied corresponds to a case where a possibility that the detection failure of a keyword occurs is high. Here, that reason will be described.

Figure 2A:
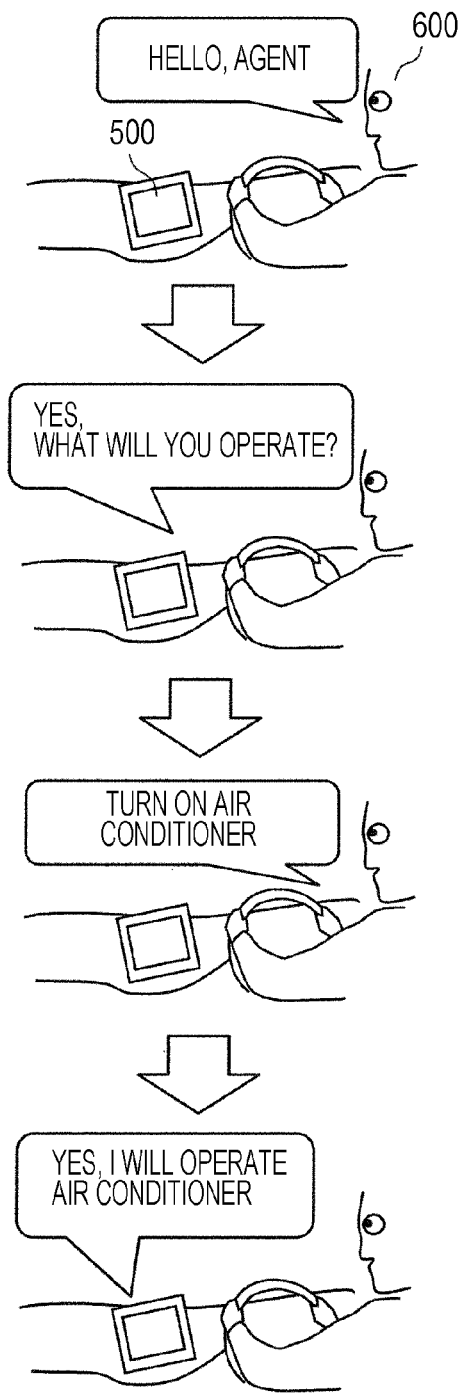
FIGS. 2A and 2B are diagrams illustrating examples of operations of a user in the first embodiment.
Figure 2B:
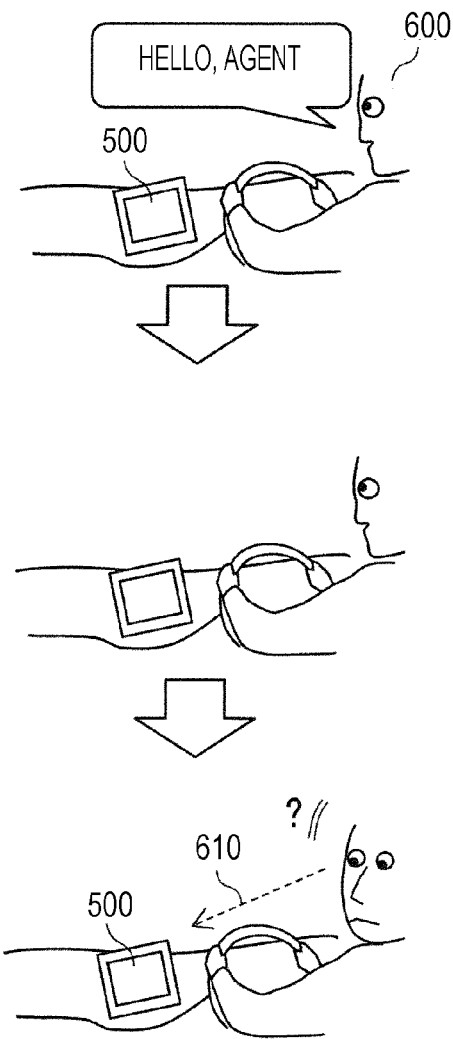

FIGS. 2A and 2B are diagrams illustrating the operations of the user at the time of performing the keyword utterance operation.

Here, as illustrated in FIGS. 2A and 2B, a case is exemplified where the operation target 500 is the car air-conditioner controller equipped with a display screen and a speaker. The operation assisting device 100 is incorporated into the operation target 500 that is, for example, the car air-conditioner controller.

Here, it is assumed that, as a keyword for activating a voice operation function for the operation target 500, based on voice interaction with the user, "Hello, agent" is preliminarily registered in the operation assisting device 100. In addition, the voice operation function is a function used by the operation target 500 to receive an operation based on a spoken voice, and is realized using, for example, the voice recognition function of the operation assisting device 100. In the following description, to determine that a keyword is spoken when the keyword is spoken is called "keyword detection".

In a case where the keyword detection for a spoken voice of "Hello, agent" spoken by a user 600 succeeds, the operation target 500 starts voice interaction as the above-mentioned predetermined operation, as illustrated in, for example, FIG. 2A. The operation target 500 outputs, for example, a voice of "Yes, what will you operate?". In a case where the user subsequently speaks "Turn on the air conditioner", the operation target 500 detects this and outputs a voice of "Yes, I will operate the air conditioner" as a response, thereby turning on the car air-conditioner.

On the other hand, in a case where the keyword detection fails, the operation target 500 does not start the above-mentioned predetermined operation and does not output the voice of "Yes, what will you operate?", as illustrated in FIG. 2B. In response to this, the user 600 who expected the operation target 500 to make some kind of response unconsciously directs eyes 610 at the operation target 500, as illustrated in FIG. 2B. In addition, a probability that the user 600 directs the eyes 610 at the operation target 500 increases with an increase in the number of times the keyword detection continuously fails.

Accordingly, a case where the eyes 610 of the user 600 are directed at the operation target 500 and a relatively high evaluation value lower than the determination threshold value is calculated immediately before that, a possibility that the detection failure of a keyword occurs may be high.

Figure 3:
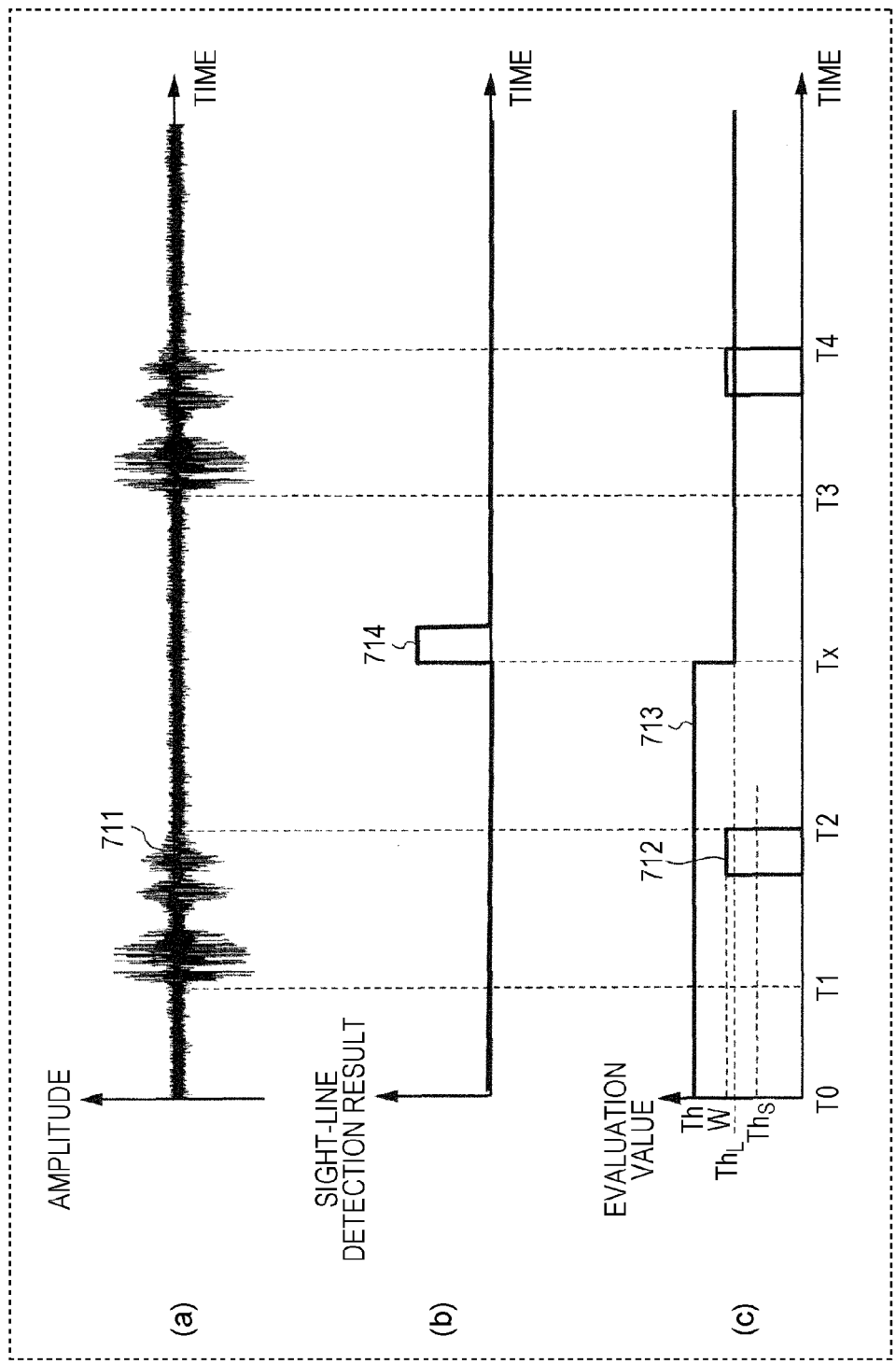
FIG. 3 is a diagram illustrating an example of a state in which a criterion for keyword determination is lowered in the first embodiment.

FIG. 3 is a diagram illustrating an example of a state in which the criterion for the keyword determination is lowered.

FIG. 3(a) is a diagram illustrating the temporal waveform of an input voice. FIG. 3(b) is a diagram illustrating a detection result of a sight-line direction. FIG. 3(c) is a diagram illustrating a relationship between the determination threshold value and the evaluation value. Horizontal axes in FIG. 3 each correspond to the same temporal axis.

It is assumed that a keyword is spoken during a time interval, for example, from time T1 to time T2. In this case, as illustrated in FIG. 3(a), a waveform 711 corresponding to the time interval from the time T1 to the time T2 appears, and as illustrated in FIG. 3(c), an evaluation value 712 is calculated as a value W with timing corresponding to the time interval.

Here, it is assumed that, as illustrated in FIG. 3(c), the value W is less than the default value Th of the lower limit (determination threshold value) 713 of the first level and greater than or equal to the lower limit $Th_S$ of the second level. In other words, it is assumed that the value W is at the second level. In this case, as a general rule the keyword detection fails.

However, it is assumed that, as illustrated in FIG. 3(b), at time Tx after the time T2, a detection result 714 indicating that the eyes of the user are directed at the operation target 500 is obtained.

In this case, since the above-mentioned second condition is satisfied, the lower limit (determination threshold value) 713 of the first level is changed to a lower value $Th_L$, as illustrated in FIG. 3(c). The value $Th_L$ after being changed is, for example, the value of 80% of the default value Th. Then, in a case where the same utterance is performed again during a time interval, for example, from time T3 to time T4, even the evaluation value of the same value W is greater than or equal to the lower limit (determination threshold value) 713 of the first level. As a result, the second keyword detection succeeds.

In this way, it is possible for the operation assisting device 100 to more reliably prevent a detection failure when a keyword is repeatedly spoken. In addition, since the operation assisting device 100 lowers in a limited way the determination criterion only in a case where the second condition is satisfied, it is possible to realize the prevention of the above-mentioned detection failure while reducing the false detection as much as possible.

<Operation of Operation Assisting Device>

Next, the operation of the operation assisting device 100 will be described.

Figure 4:
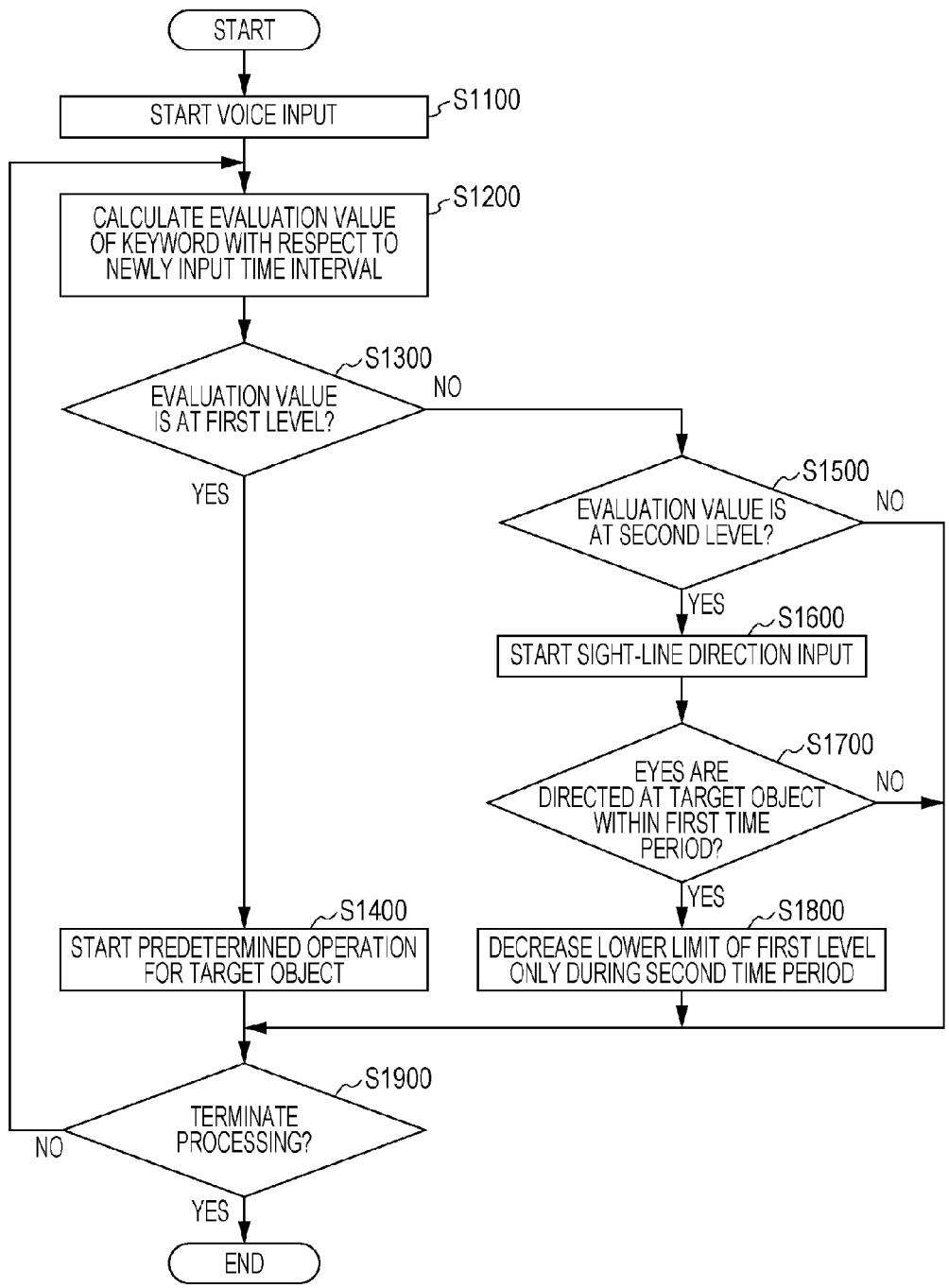
FIG. 4 is a flowchart illustrating an example of an operation of the operation assisting device according to the first embodiment.

FIG. 4 is a flowchart illustrating an example of the operation of the operation assisting device 100.

First, in a step S1100, the voice input unit 200 starts inputting of voice data at given time intervals.

In addition, in a step S1200, the keyword determination unit 410 calculates the evaluation value of a keyword for the time interval of newly input voice data.

In addition, in a step S1300, the keyword determination unit 410 determines whether or not the calculated evaluation value is at the first level. In other words, the keyword determination unit 410 compares the evaluation value with the determination threshold value. In an initial state, the determination threshold value that is a comparison target is the default value Th.

In a case where the evaluation value is at the first level (S1300: YES), the keyword determination unit 410 moves the processing to a step S1400. In addition, in a case where the evaluation value is not at the first level (S1300: NO), the keyword determination unit 410 moves the processing to a step S1500.

In the step S1400, the keyword determination unit 410 starts, for the operation target 500, a predetermined operation such as, for example, the voice interaction described in FIGS. 2A and 2B, and moves to a step S1900 described later.

In the step S1500, the failure determination unit 421 determines whether or not the evaluation value is at the second level. In other words, the failure determination unit 421 determines whether or not a notice informing about the fact that the calculated evaluation value is at the second level is received from the keyword determination unit 410.

In a case where the evaluation value is not at the second level (S1500: NO), the failure determination unit 421 moves the processing to the step S1900 described later. In addition, in a case where the evaluation value is at the second level (S1500: YES), the failure determination unit 421 moves the processing to a step S1600.

In the step S1600, the sight-line input unit 300 starts inputting of the direction of a sight line. In other words, the sight-line input unit 300 starts the sight line determination at given time intervals. In a case where the time interval of the sight line determination is sufficiently short, even if a time period during which eyes are directed at the operation target 500 is only a brief moment, it is possible for the sight-line input unit 300 to detect the time period. In addition, the processing operation for starting the inputting of the direction of the sight line in the step S1600 may be performed in an earlier stage such as in the step S1100.

In addition, in a step S1700, the failure determination unit 421 determines whether or not eyes are directed at the operation target 500 within a predetermined first time period from the time interval of a spoken voice whose evaluation value is at the second level. In other words, the failure determination unit 421 determines whether or not a notice informing about the fact that the eyes of the user are directed at the operation target 500 is received from the sight-line input unit 300. Using a timer (not illustrated), the failure determination unit 421 measures an elapsed time from the time interval of a spoken voice with beginning at, for example, a timing when the processing moves to the step S1700.

It is preferable that, in a case where the operation target 500 does not start the predetermined operation, the first time period is a time period slightly longer than a time period from when a keyword is spoken till when the user directs eyes at the operation target 500, and the first time period is, for example, five seconds.

In addition, usually, it takes a time period of about a few seconds for the user to recognize no response of the operation target 500 after the utterance of a keyword and to direct eyes at the operation target 500. Accordingly, the failure determination unit 421 may be allowed not to perform the determination processing in the step S1700 until predetermined time has elapsed since the time interval of a spoken voice.

In a case where eyes are not directed at the operation target 500 within the first time period (S1700: NO), the failure determination unit 421 moves the processing to the step S1900 described later. In addition, in a case where eyes are directed at the operation target 500 within the first time period (S1700: YES), the failure determination unit 421 moves the processing to a step S1800.

In the step S1800, the parameter setting unit 422 causes the determination threshold value (the lower limit of the first level), used by the keyword determination unit 410 for the keyword determination, to be decreased only during a second time period, and moves the processing to the step S1900. In other words, in a case where the determination threshold value is changed based on an instruction from the parameter setting unit 422, the keyword determination unit 410 restores the determination threshold value to a value before being changed when the predetermined second time period has elapsed since being changed.

It is preferable that, in a case where the operation target 500 does not start the predetermined operation, the second time period is a time period slightly longer than a time period from when the user directs eyes at the operation target 500 till when a keyword is spoken again, and the second time period is, for example, three seconds.

In the step S1900, the keyword determination unit 410 determines whether or not a user operation or the like instructs about termination of the processing of the keyword utterance operation. In a case where no instruction to terminate the processing is given (S1900: NO), the keyword determination unit 410 returns the processing to the step S1200.

In other words, while the keyword determination (S1200) for the time interval of newly input voice data is repeated, in a case of passing through the step S1800, the threshold value is decreased only during the second time period. Accordingly, in a case where a keyword is spoken again during such a time period, it becomes easy to detect such utterance (see FIG. 3(c)).

In addition, in a case of receiving an instruction to terminate the processing (S1900: YES), the keyword determination unit 410 terminates a series of operations.

According to such an operation, in a case where the above-mentioned first condition is not satisfied, it is possible for the operation assisting device 100 to sequentially determine whether or not the above-mentioned second condition is satisfied. In addition, in a case where the second condition is satisfied, it is possible for the operation assisting device 100 to lower the criterion for the keyword determination during a given period of time and to perform the keyword secondary determination while targeting at a newly input spoken voice.

Figure 5:
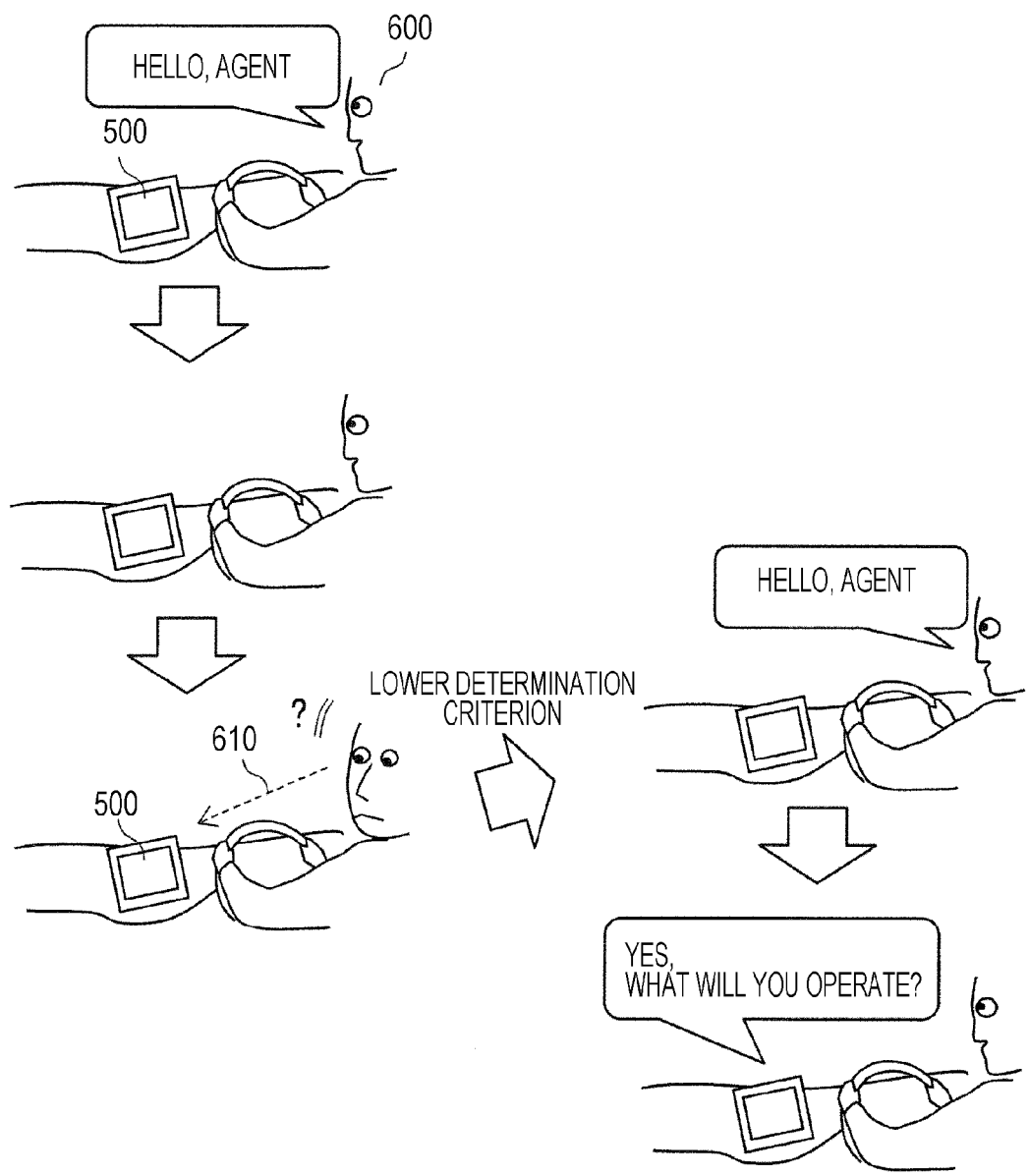
FIG. 5 is a diagram illustrating examples of operations of the user and an operation target in a case where the operation assisting device according to the first embodiment is used.

FIG. 5 is a diagram illustrating examples of the operations of the user and the operation target 500 in a case where the operation assisting device 100 is used and FIG. 5 corresponds to FIGS. 2A and 2B.

It is assumed that, as illustrated in FIG. 5, the keyword detection for a spoken voice of "Hello, agent" spoken by the user 600 fails and the user 600 directs eyes 610 at the operation target 500. Then, by the function of the operation assisting device 100, the determination criterion for the keyword determination is temporarily lowered. In addition, in a case where the user 600 speaks again "Hello, agent" during a time period in which the determination criterion is lowered, the keyword detection for the spoken voice succeeds even if the evaluation value is equal. In addition, a voice of "Yes, what will you operate?" is output from the operation target 500. In other words, a state in which the keyword utterance operation is disabled is avoided.

As described above, in a state in which the keyword determination is performed based on the evaluation value, the operation assisting device 100 according to the present embodiment lowers the determination criterion for the keyword determination under the condition that the eyes of the user 600 are directed at the operation target 500 after the evaluation value falls within a predetermined range.

From this, it is possible for the operation assisting device 100 to realize the highly accurate keyword utterance operation in which the reduction of the false detection and the reduction of the detection failure are balanced with each other. In other words, in a state of holding the feature of keyword detection whose noise tolerance is high, it is possible for the operation assisting device 100 to avoid a situation where it is difficult to operate the operation target 500 even if a keyword is repeatedly spoken.

In addition, it is possible for the operation assisting device 100 according to the present embodiment to perform the keyword determination on a keyword spoken at a timing decided by the user. In addition, in the operation assisting device 100 according to the present embodiment, it is only necessary for the user 600 to perform a motion of unconsciously directing eyes for a moment and it is not necessary for the user 600 to speak a keyword while keeping eyes on the operation target 500.

Accordingly, it is possible for the operation assisting device 100 according to the present embodiment to realize the above-mentioned advantageous effect in wide uses, compared with the related art.

One of the merits of being able to operate an apparatus without requiring a manual operation such as pressing a button, for example, is a merit of being able to operate the apparatus with nothing held even if being located away. A voice interface requiring no button operation is suitable for use in a situation such as driving a car, in which it is difficult to release a hand, and it is possible to realize an apparatus operation with a feeling such as asking, in a voice, a fellow passenger in a front passenger seat to operate an apparatus.

Example of Modification to First Embodiment

Note that, how to change the determination threshold value is not limited to the above-mentioned example.

Figure 6:
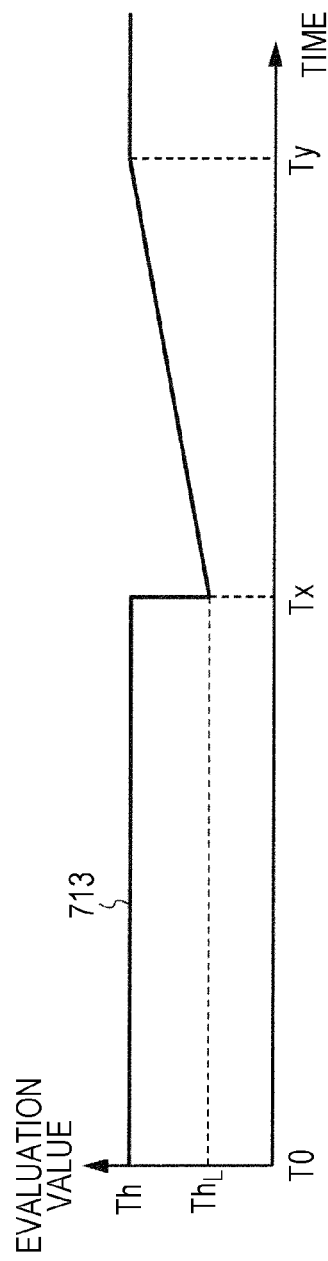
FIG. 6 is a diagram illustrating another example of how to change a determination threshold value in the first embodiment.

FIG. 6 is a diagram illustrating another example of how to change the determination threshold and corresponds to FIG. 3(c).

As illustrated in FIG. 6, after changing the lower limit (determination threshold value) 713 of the first level to the value $Th_L$ lower than the default value Th at the time Tx when it is determined that the second condition is satisfied, the keyword determination unit 410 may slowly increase the lower limit (determination threshold value) 713. At this time, it is desirable that the keyword determination unit 410 changes the lower limit (determination threshold value) 713 of the first level at a rate such that the lower limit (determination threshold value) 713 is restored to the default value Th at time Ty when a possibility that the user speaks a keyword again is sufficiently low.

From this, it is possible to increase ease of success of the keyword detection with a decrease in elapsed time from the satisfaction of the second condition. In addition, it is possible to reduce false determination due to the influence of a noise.

In addition, in a case where, at a time interval within a predetermined time period, it is repeatedly determined that the evaluation value is at the second level, the keyword determination unit 410 may decrease the determination threshold value stepwise in accordance with an increase in the number of times that determination is performed.

In addition, the keyword determination unit 410 may further decrease the determination threshold value with an increase in a time period during which the eyes are continuously directed at the operation target 500 or with an increase in a possibility that the eyes are directed at the operation target 500. In addition, the keyword determination unit 410 may further decrease the determination threshold value with an increase in the sound volume of a spoken voice or with a decrease in a time interval between the times at which it is determined that the evaluation value is at the second level.

In addition, the operation target 500 may be a device that performs voice interaction, and the operation assisting device 100 may have the function of recognizing a keyword in such voice interaction. In this case, in a case of changing the determination threshold value to a lower value with respect to a keyword used for starting the voice interaction, the operation assisting device 100 may maintain the low determination threshold value in order to reduce the detection failure in the voice interaction until the voice interaction is terminated.

Second Embodiment

A second embodiment of the present disclosure is an example in which the keyword secondary determination performed with the lowered determination criterion is performed while targeting at an initial spoken voice that is a trigger of the secondary determination.

<Configuration of Operation Assisting Device>

Figure 7:
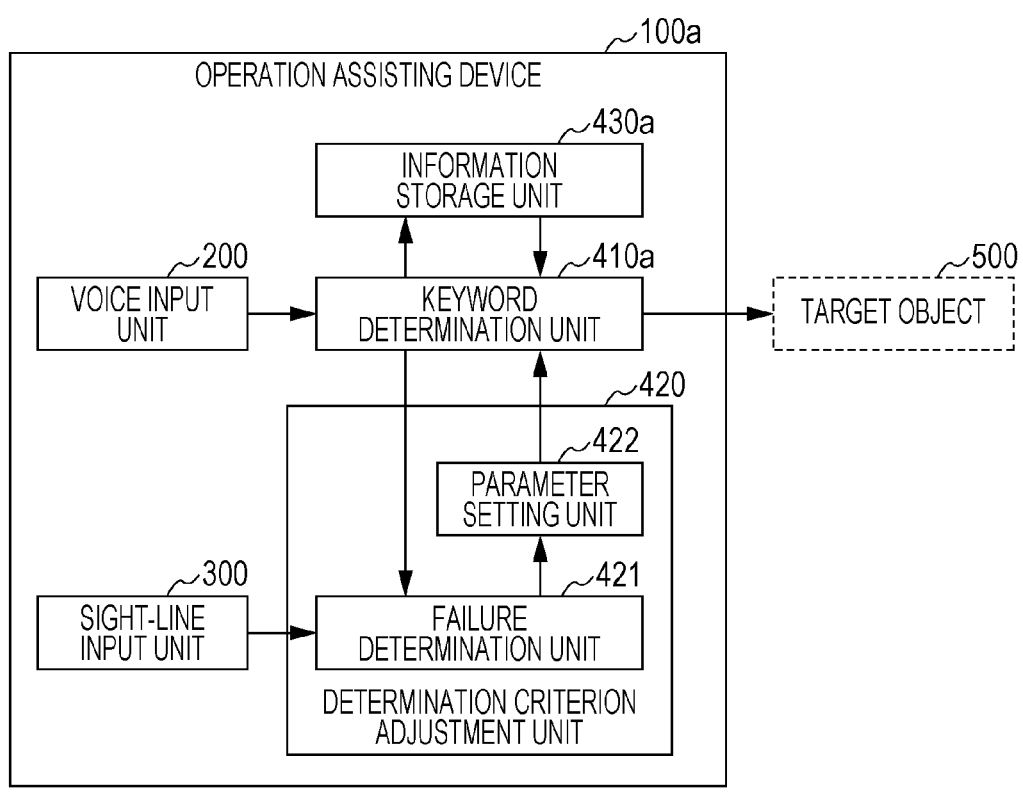
FIG. 7 is a block diagram illustrating an example of a configuration of an operation assisting device according to a second embodiment of the present disclosure.

FIG. 7 is a block diagram illustrating an example of the configuration of an operation assisting device according to the present embodiment and corresponds to FIG. 1. The same symbol is assigned to the same portion as that in FIG. 1 and the description thereof will be omitted.

As illustrated in FIG. 7, an operation assisting device 100a according to the present embodiment includes a keyword determination unit 410a and an information storage unit 430a.

The information storage unit 430a includes an information recording medium such as a memory and is used by the keyword determination unit 410a. Specifically, the information storage unit 430a stores therein a spoken voice during a time interval in which it is determined that the evaluation value is at the second level, and the evaluation value.

The keyword determination unit 410a has the same function as that of the keyword determination unit 410 in the first embodiment. In this regard, however, the keyword determination unit 410a sequentially stores, in the information storage unit 430a, voice data during the time interval in which it is determined that the evaluation value is at the second level, in other words, during a time interval in which a possibility that a keyword is spoken is relatively high. In addition, along therewith, the keyword determination unit 410a stores, in the information storage unit 430a, the above-mentioned evaluation value determined to be at the second level. In addition, upon receiving, from the parameter setting unit 422, an instruction to change the determination threshold value to a lower value and to perform the secondary determination of whether or not the first condition is satisfied, the keyword determination unit 410a performs such secondary determination while targeting at the voice data of a spoken voice (in other words, a previously input spoken voice) stored in the information storage unit 430a.

<Lowering of Determination Criterion>

Figure 8:
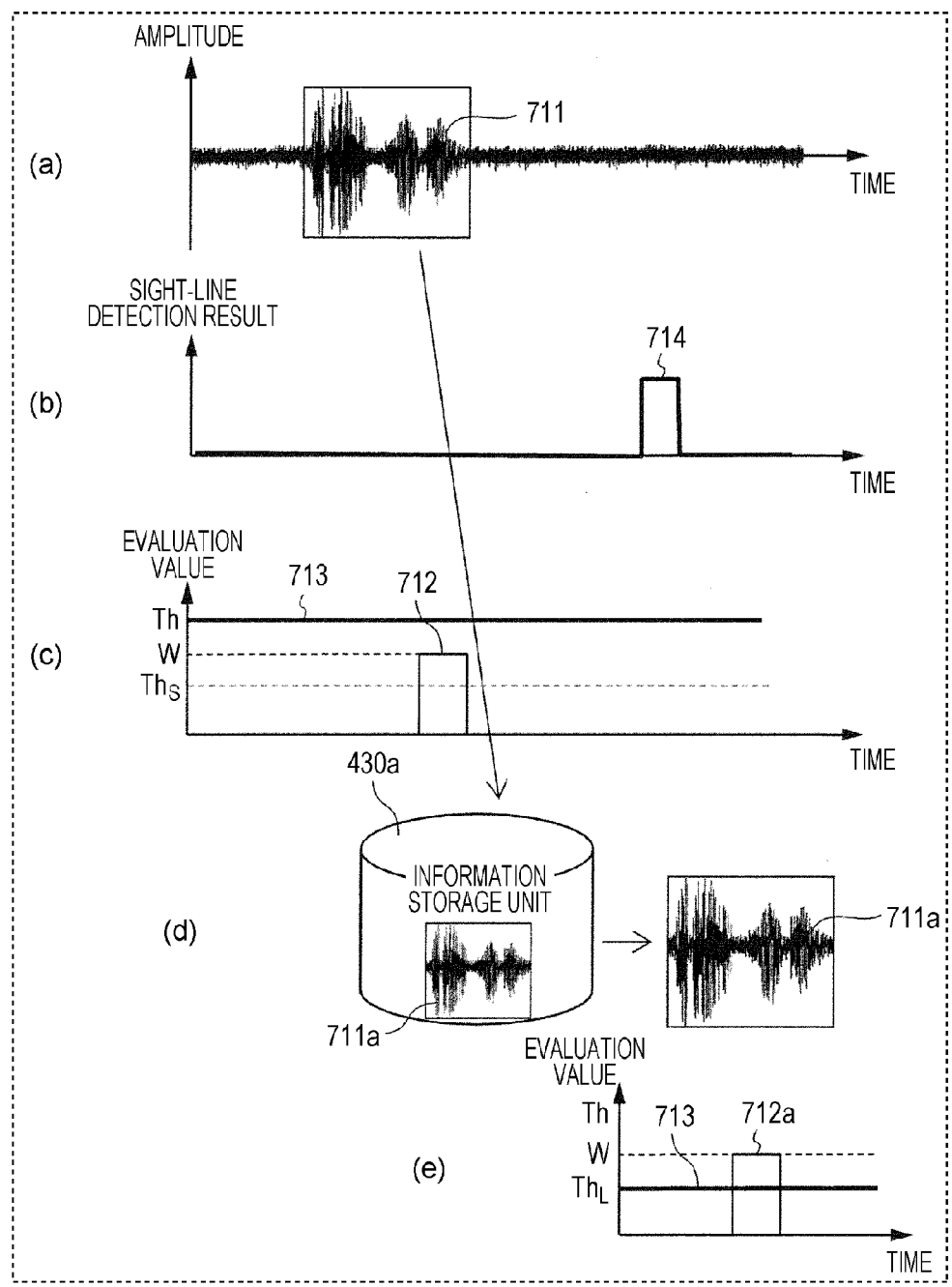
FIG. 8 is a diagram illustrating an example of a state in which a criterion for keyword determination is lowered in the second embodiment.

FIG. 8 is a diagram illustrating an example of a state in which a criterion for keyword determination is lowered, and FIG. 8 correspond to FIG. 3 in the first embodiment. The same symbol is assigned to the same portion as that in FIG. 3 and the description thereof will be omitted.

FIG. 8(a) is a diagram illustrating the temporal waveform of an input voice. FIG. 8(b) is a diagram illustrating a detection result of a sight-line direction. FIG. 8(c) is a diagram illustrating a relationship between the determination threshold value and the evaluation value in an initial state. FIG. 8(d) is a diagram illustrating a state of voice data that is a target of the secondary determination. FIG. 8(e) is a diagram illustrating a relationship between the determination threshold value and the evaluation value at the time of the secondary determination. Horizontal axes in FIG. 8 each correspond to the same temporal axis.

It is assumed that, as illustrated in FIG. 8(a), a keyword is spoken and the corresponding waveform 711 appears. However, it is assumed that, as illustrated in FIG. 8(c), the value W of the evaluation value 712 is less than the default value Th of the lower limit (determination threshold value) 713 of the first level and is greater than or equal to the lower limit $Th_S$ of the second level. In this case, as illustrated in FIG. 8(d), voice data (hereinafter called "keyword candidate data") 711a during a time interval that causes the value W to be obtained is stored in the information storage unit 430a.

In addition, it is assumed that, as illustrated in FIG. 8(b), the detection result 714 indicating that the eyes of the user are directed at the operation target 500 is obtained. In this case, as illustrated in FIG. 8(e), the keyword determination unit 410a changes the lower limit (determination threshold value) 713 of the first level to the lower value $Th_L$. In addition, the keyword determination unit 410a reads the stored keyword candidate data 711a from the information storage unit 430a and uses the value $Th_L$ after such changing, as the determination threshold value 713. Then, even the evaluation value of, for example, the same value W is greater than or equal to the determination threshold value 713. As a result, the keyword detection tried again turns out to succeed.

<Operation of Operation Assisting Device>

Figure 9:
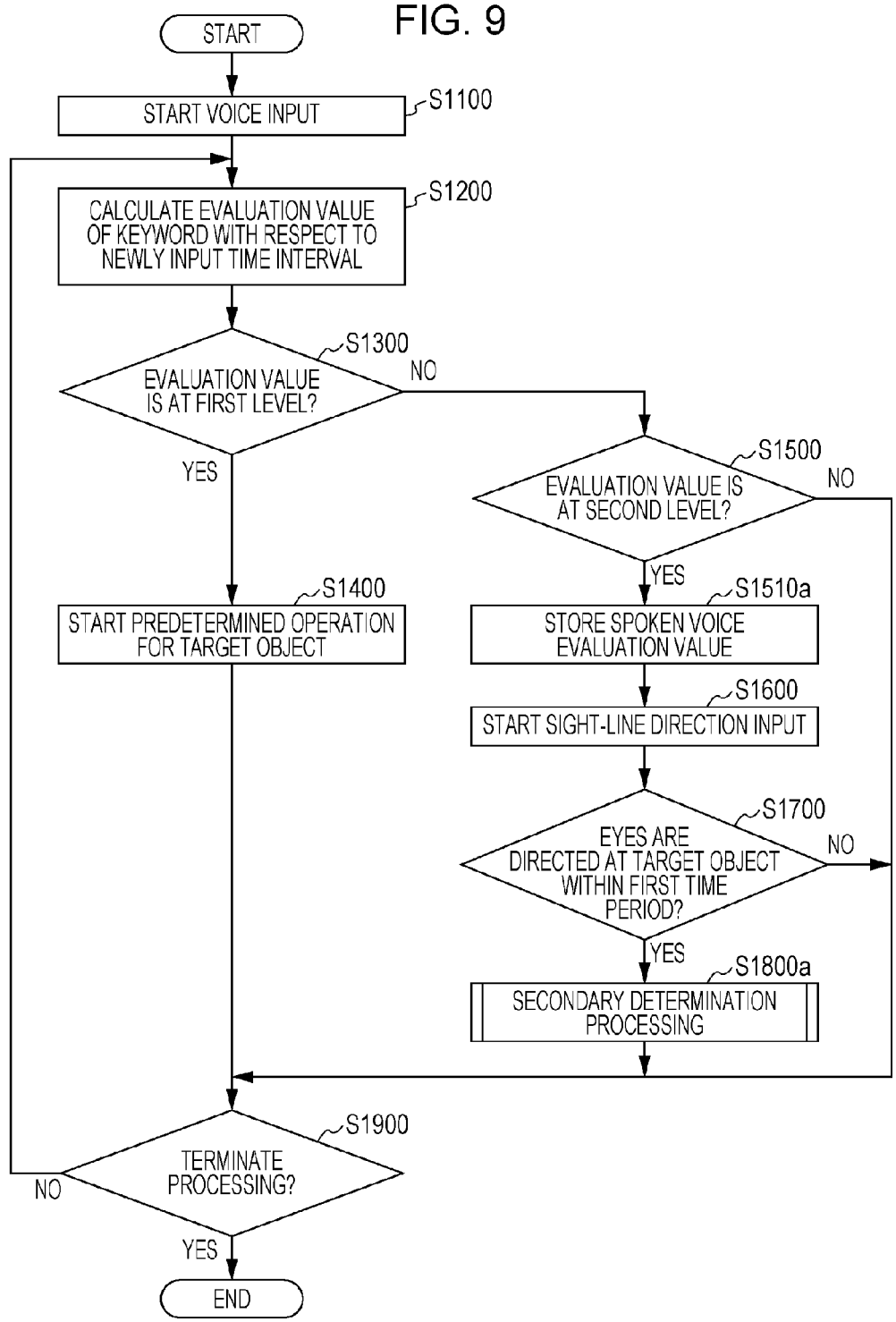
FIG. 9 is a flowchart illustrating an example of an operation of the operation assisting device according to the second embodiment.

FIG. 9 is a flowchart illustrating an example of the operation of the operation assisting device 100a and corresponds to FIG. 4 in the first embodiment. The same symbol is assigned to the same portion as that in FIG. 4 and the description thereof will be omitted.

In a case where the calculated evaluation value is at the second level (S1500: YES), in a step S1510a the keyword determination unit 410a stores, in the information storage unit 430a, a spoken voice (voice data) whose evaluation value is determined to be at the second level, and moves to the step S1600.

In addition, in a case where eyes are directed at the operation target 500 within the first time period (S1700: YES), the keyword determination unit 410a executes secondary determination processing, in a step S1800a. The secondary determination processing is processing for performing the keyword secondary determination on the stored spoken voice.

Figure 10:
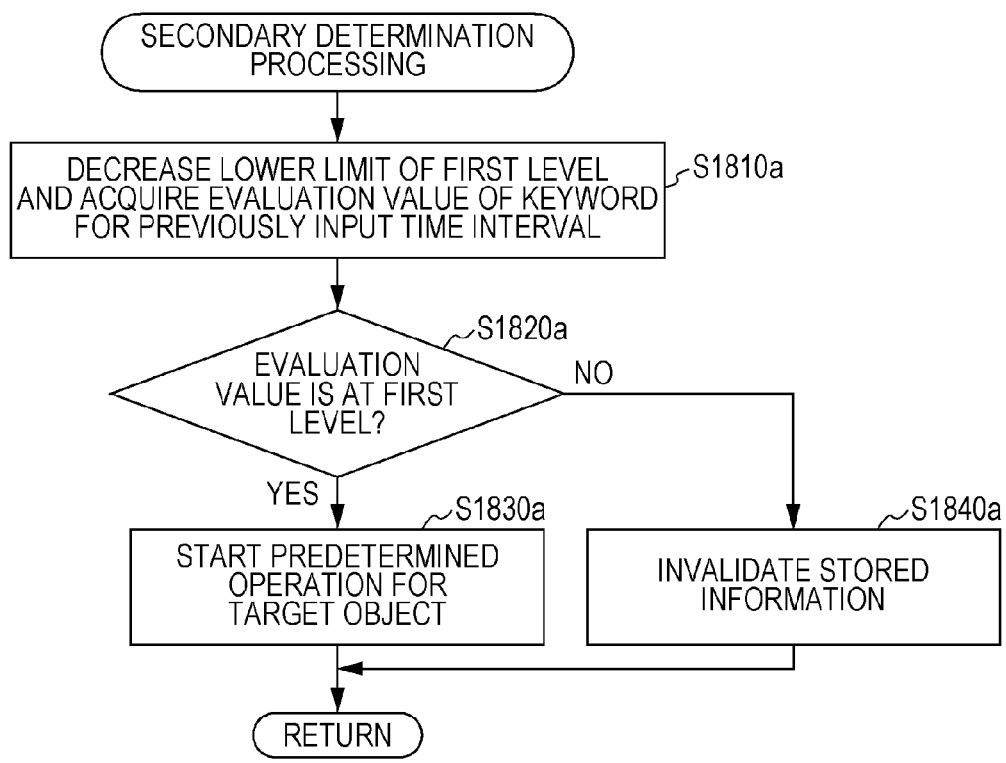
FIG. 10 is a flowchart illustrating an example of secondary determination processing in the second embodiment.

FIG. 10 is a flowchart illustrating an example of the secondary determination processing (the step S1800a in FIG. 9).

In a step S1810a, the keyword determination unit 410a decreases the determination threshold value (the lower limit of the first level), used for the keyword determination, only during the second time period, and acquires the evaluation value of a keyword for a previously input time interval. The evaluation value may be acquired by performing again voice recognition processing on a spoken voice stored in the information storage unit 430a and calculating an evaluation value, or may be acquired by reading an evaluation value stored in the information storage unit 430a.

In addition, in the same way as the step S1300 in FIG. 4 or FIG. 9, in a step S1820a, the keyword determination unit 410a determines whether or not the calculated evaluation value is at the first level. In a case where the evaluation value is at the first level (S1820a: YES), the keyword determination unit 410a moves the processing to a step S1830a. In addition, in a case where the evaluation value is not at the first level (S1820a: NO), the keyword determination unit 410a moves the processing to a step S1840a.

In the step S1830a, in the same way as the step S1400 in FIG. 4 or FIG. 9, the keyword determination unit 410a starts a predetermined operation for the operation target 500 and returns to the processing in FIG. 9.

In addition, in the step S1840a, the keyword determination unit 410a invalidates information (the voice data and the evaluation value) stored in the information storage unit 430a and returns to the processing in FIG. 9. The keyword determination unit 410a deletes, for example, the stored information from the information storage unit 430a.

Based on such processing, it is possible for the operation assisting device 100a to perform the keyword determination in which the determination criterion is lowered, while targeting at an initial spoken voice that is a trigger of the keyword determination with a lowered criterion.

Figure 11:
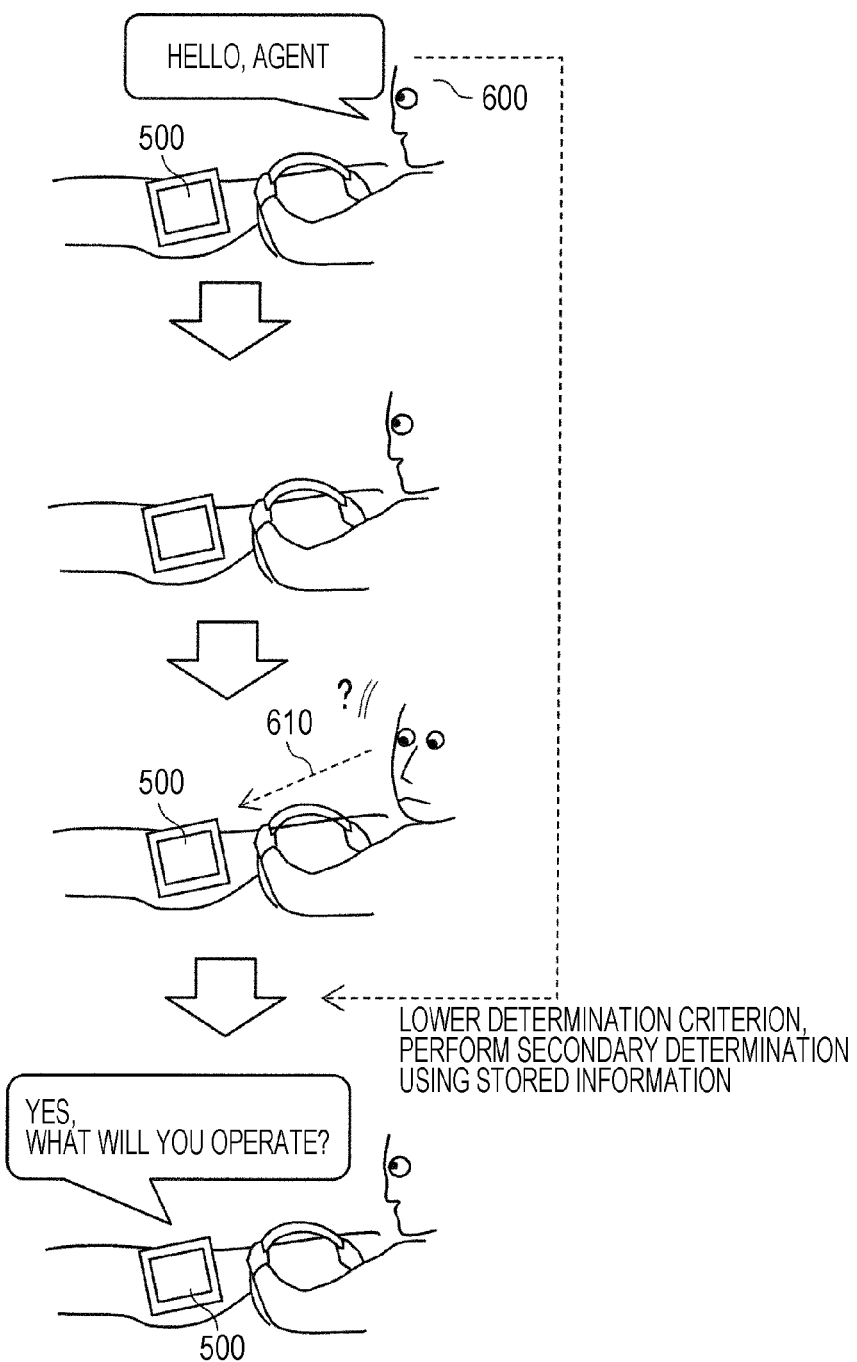
FIG. 11 is a diagram illustrating examples of operations of the user and an operation target in a case where the operation assisting device in the second embodiment is used.

FIG. 11 is a diagram illustrating examples of the operations of the user and the operation target 500 in a case where the operation assisting device 100*a* is used, and FIG. 11 corresponds to FIGS. 2A and 2B and FIG. 5 in the first embodiment.

It is assumed that, as illustrated in FIG. 11, keyword detection for a spoken voice of "Hello, agent" spoken by the user 600 fails and the user 600 directs the eyes 610 at the operation target 500. Then, by the function of the operation assisting device 100*a*, the determination criterion for the keyword determination is lowered, and using the information (the voice data and the evaluation value) stored based on the spoken voice of "Hello, agent" previously spoken, the keyword secondary determination is performed. As a result, the keyword detection succeeds before another utterance is performed, and a voice of "Yes, what will you operate?" is output from the operation target 500.

As described above, without requiring another keyword utterance from the user, it is possible for the operation assisting device 100*a* according to the present embodiment to perform the secondary determination for a keyword by lowering the determination criterion.

Accordingly, in the operation assisting device 100*a* according to the present embodiment, it is possible to obtain a determination result that a keyword is spoken, at earlier time than in the first embodiment, and it is possible to start the predetermined operation for the operation target 500. In addition, since the operation assisting device 100*a* according to the present embodiment does not require another utterance of a keyword, it is possible to reduce a burden on the user.

In addition, the keyword determination unit 410*a* may perform the keyword secondary determination with the determination criterion lowered while targeting at a spoken voice other than an initial spoken voice that is the trigger of the secondary determination, the former spoken voice being already subjected to the keyword determination. In this case, it is only necessary for the keyword determination unit 410*a* to perform the voice recognition processing on, for example, voice data input at the predetermined last time and to determine whether an evaluation value greater than or equal to the changed determination threshold value is obtained.

Examples of Applications of Embodiments

In addition, the operation assisting device described above may regard a plurality of keywords as targets of detection. In addition, in the operation assisting device, keywords corresponding to a plurality of operations for the same operation target may be registered. For example, as for the air conditioner operation, keywords associated with operations such as "turn on the air conditioner", "turn up the air conditioner", and "stop the air conditioner" may be regarded as detection targets. In addition, in a case where different keywords are registered for respective operation targets, it is necessary to determine whether or not the eyes of the user are directed to the respective operation target, with respect to each of the operation targets. In this case, the operation assisting device uses, for example, a table in which the respective registered keywords and the directions of the operation targets (sight-line directions to be detected) are associated with each other.

FIG. 12 is a diagram illustrating an example of a table in which keywords and sight-line directions are associated with each other.

The operation assisting device stores therein, for example, a table 720 illustrated in FIG. 12. Keywords 722, registered so as to be associated with respective pieces of identification information (No) 721, and pieces of information 723 indicating respective sight-line directions are described so as to be associated with each other, in the table 720. In addition, as the pieces of information 723 indicating respective sight-line directions, direction vectors in a coordinate system based on, for example, a camera position are actually described.

In addition, it is desirable that, as the default value of the determination threshold value and the changed value thereof, appropriate values are adopted based on the type of evaluation value, the uses of the operation assisting device, the degree of accuracy desired by the user, and so forth. The appropriate values are decided based on, for example, experiments or an empirical rule.

In addition, at a time point when the second condition is satisfied, in other words, under the condition that eyes are directed at the operation target after the evaluation value falls within a predetermined range, the operation assisting device may determine that a keyword is spoken, without performing the keyword determination again. In other words, the operation assisting device may lower a criterion for the already performed keyword determination itself. In this case, it is desirable that the lower limit of the second level is a value as high as able to prevent the false detection with the required degree of accuracy.

In addition, the type of evaluation value, a method for acquiring the evaluation value, and a method for sight line determination, adopted by the operation assisting device, and the uses of a keyword detection result are not limited to the above-mentioned examples. For example, in addition to various kinds of in-vehicle devices such as a car navigation device and a car audio device, various kinds of apparatuses and equipment such as household electrical appliances and plant equipment may be regarded as the above-mentioned target objects.

In addition, part of the configuration of the operation assisting device may be arranged, as a client side device, in the vicinity of an operation target, and the other part of the configuration of the operation assisting device may be arranged as a device or a system, separated from a client device.

For example, the keyword determination unit and the determination criterion adjustment unit, described above, may be arranged, as a keyword detection device, in a server or the like arranged on a communication network.

In this case, in the operation assisting device, it is only necessary to provide, for example, a transmission unit that transmits, to the keyword detection device, information indicating an input spoken voice and whether or not eyes are directed at the operation target, and a reception unit that receives utterance detection information transmitted from the keyword detection device. Here, the utterance detection information is information indicating that it is determined that a keyword is spoken.

In addition, in the keyword detection device, it is only necessary to provide a reception unit that receives the information transmitted from the operation assisting device, the information indicating the spoken voice and whether or not eyes are directed at the operation target, and a transmission unit that transmits the utterance detection information to the operation assisting device in accordance with the result of the keyword determination by the keyword determination unit.

Furthermore, the keyword determination unit and the determination criterion adjustment unit may be arranged in different devices independently. In this case, at least, it is necessary for the determination criterion adjustment unit to acquire the evaluation value from the keyword determination unit by communication or the like and to acquire, from the sight-line input unit, a detection result of whether or not the eyes are directed at the operation target.

By adopting such a distributed system, it becomes easy to reduce the processing load of each device or to share one functional unit between a plurality of users.

In addition, the hardware configuration of each device is not limited to the above-mentioned examples.

For example, each functional unit may be typically realized as an integrated circuit (IC). Each functional unit may be individually made into one chip, or may be made into one chip so as to include part thereof or the whole thereof. In addition, such an integrated circuit is also called large scale integration (LSI), a system LSI, a super LSI, an ultra LSI, or the like, depending on the degree of integration.

In addition, a method for achieving integration of circuits is not limited to IC and may be realized by dedicated circuits. In other words, each functional unit may be realized using a field programmable gate array (FPGA) programmable after manufacturing an LSI or a reconfigurable processor that enables re-configuration of the connections or settings of circuit cells within an LSI.

Furthermore, using various kinds of techniques for achieving integration of circuits replaceable with LSIs by virtue of advancement of the semiconductor technology or another derived technology, integration of circuits may be performed. As such a technology, for example, the application of a biotechnology may be cited.

In addition, it is only necessary for the memory of each device to be a nonvolatile memory, and the memory of each device may be a memory that holds data using switches, in such a manner as, for example, a dip switch.

The present disclosure is useful as an operation assisting device and an operation assisting method capable of realizing highly accurate keyword utterance operations in wider uses. The present disclosure is suitable for use in, for example, a voice recognition device and a voice interaction device installed in an in-vehicle device.

What is claimed is:

1. An operation assisting method, comprising:
comparing input spoken voices with a preliminarily stored keyword associated with an operation target to obtain an evaluation value of likelihood between the input spoken voices and the preliminarily stored keyword;
determining, based on the evaluation value, whether or not the preliminarily stored keyword is included in the input spoken voices by determining whether or not a first condition that the evaluation value is greater than a determination threshold value is satisfied, the preliminarily stored keyword being determined to be included in the input spoken voices when the first condition is satisfied;
determining whether or not a second condition that sight lines of a speaker are directed at the operation target after the evaluation value is obtained within a predetermined range is satisfied; and
decreasing the determination threshold value to a lesser value when the second condition is satisfied and performing a secondary determination of whether or not the first condition is satisfied.

2. An operation assisting device comprising:
a memory that stores instructions;
a processor that executes the instructions;
wherein, when executed by the processor, the instructions cause the processor to perform operations comprising:
comparing input spoken voices with a preliminarily stored keyword associated with an operation target;
calculating an evaluation value indicating a likelihood of the preliminarily stored keyword being included in the input spoken voices;
determining, based on the evaluation value, whether or not the preliminarily stored keyword is included in the input spoken voices by determining whether or not a first condition that the evaluation value is greater than a determination threshold value is satisfied, the preliminarily stored keyword being determined to be included in the input spoken voices when the first condition is satisfied; and
adjusting the determination threshold value for the evaluation value, used for the determining,
wherein the processor determines whether or not a second condition that sight lines of a speaker are directed at the operation target after the evaluation value is calculated within a predetermined range is satisfied, and
the processor decreases the determination threshold value to a lesser value when the second condition is satisfied, and performs a secondary determination of whether or not the first condition is satisfied.

3. The operation assisting device according to claim 2, wherein
the predetermined range is a numerical value range greater than a minimum value available for the evaluation value and less than the determination threshold value.

4. The operation assisting device according to claim 2, wherein
the processor starts a predetermined operation for the operation target in a case where it is determined that the preliminarily stored keyword is included in the input spoken voices.

5. The operation assisting device according to claim 2, wherein
the processor starts an operation for the operation target, based on the input spoken voices, in a case where it is determined that the preliminarily stored keyword is included in the input spoken voices.

6. The operation assisting device according to claim 2, wherein
the processor determines, in a case where it is detected that the sight lines of the speaker are directed at the operation target within a first time period from inputting of the input spoken voices, that the second condition is satisfied.

7. The operation assisting device according to claim 2, wherein
the processor performs the secondary determination using newly input spoken voices not subjected to the determination threshold value before being decreased to the lower value.

8. The operation assisting device according to claim 7, wherein
the processor restores the determination threshold value from the lower value when a second time period has elapsed since the determination threshold value is decreased to the lower value.

9. The operation assisting device according to claim 2, further comprising:
a storage that stores information indicating the input spoken voices or the evaluation value,
wherein the processor performs the secondary determination using the information stored in the storage while using the input spoken voices already subjected to the determination threshold value before being decreased to the lower value.

10. The operation assisting device according to claim 2, further comprising:
a camera that captures an image of the speaker, wherein the processor determines whether or not the sight lines of the speaker are directed at the operation target from the image.

11. The operation assisting device according to claim 10, wherein the camera is a visible light camera.

12. The operation assisting device according to claim 10, wherein the camera is an infrared camera.

13. The operation assisting method according to claim 1, wherein
the predetermined range is a numerical value range greater than a minimum value available for the evaluation value and less than the determination threshold value.

14. The operation assisting method according to claim 1, further comprising:
starting a predetermined operation for the operation target in a case where it is determined that the preliminarily stored keyword is included in the input spoken voices.

15. The operation assisting method according to claim 1, further comprising:
starting an operation for the operation target, based on the input spoken voices, in a case where it is determined that the preliminarily stored keyword is included in the input spoken voices.

16. The operation assisting method according to claim 1, wherein
the second condition is determined to be satisfied when the sight lines of the speaker are directed at the operation target within a first time period from inputting of the input spoken voices.

17. The operation assisting method according to claim 1, the secondary determination is performed using newly input spoken voices not subjected to the determination threshold value before being decreased to the lower value.

18. The operation assisting method according to claim 17, the determination threshold value is restored from the lower value when a second time period has elapsed since the determination threshold value is decreased to the lower value.

19. The operation assisting method according to claim 1, further comprising:
storing information indicating the input spoken voices or the evaluation value,
wherein the secondary determination is performed using the information while using the input spoken voices already subjected to the determination threshold value before being decreased to the lower value.

* * * * *